US011818718B2

(12) United States Patent
Takeda et al.

(10) Patent No.: US 11,818,718 B2
(45) Date of Patent: Nov. 14, 2023

(54) PHYSICAL UPLINK CONTROL CHANNEL FORMAT FOR SINGLE UPLINK OPERATION IN DUAL CONNECTIVITY MODE WITH TIME DIVISION DUPLEXING PRIMARY CELL

(71) Applicant: QUALCOMM Incorporated, San Diego, CA (US)

(72) Inventors: Kazuki Takeda, Tokyo (JP); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 318 days.

(21) Appl. No.: 17/009,152

(22) Filed: Sep. 1, 2020

(65) Prior Publication Data

US 2021/0105763 A1  Apr. 8, 2021

Related U.S. Application Data

(60) Provisional application No. 62/910,159, filed on Oct. 3, 2019.

(51) Int. Cl.
*H04W 72/21* (2023.01)
*H04L 1/1867* (2023.01)

(52) U.S. Cl.
CPC ........... *H04W 72/21* (2023.01); *H04L 1/1896* (2013.01)

(58) Field of Classification Search
CPC .... H04L 5/0053; H04L 5/0055; H04L 5/0057
See application file for complete search history.

(56) References Cited

U.S. PATENT DOCUMENTS

| 2017/0041923 | A1* | 2/2017 | Park | H04L 5/0053 |
| 2017/0048052 | A1 | 2/2017 | Lee et al. | |
| 2018/0013533 | A1* | 1/2018 | Yang | H04L 5/0053 |
| 2018/0167934 | A1 | 6/2018 | Seo et al. | |
| 2021/0259006 | A1* | 8/2021 | Yoshioka | H04W 72/1257 |

OTHER PUBLICATIONS

International Search Report and Written Opinion—PCT/US2020/070484—ISA/EPO—dated Nov. 12, 2020.

* cited by examiner

*Primary Examiner* — Bo Hui A Zhu
(74) *Attorney, Agent, or Firm* — Harrity & Harrity, LLP

(57) ABSTRACT

Various aspects of the present disclosure generally relate to wireless communication. In some aspects, a user equipment (UE) may determine a physical uplink control channel (PUCCH) format and a PUCCH resource to be used for concurrently transmitting hybrid automatic repeat request (HARQ) feedback and additional uplink control information based at least in part on downlink control information including a downlink assignment index equal to one. The UE may transmit one or more of the HARQ feedback or the additional uplink control information using the PUCCH format and the PUCCH resource. Numerous other aspects are provided.

30 Claims, 9 Drawing Sheets

PHYSICAL UPLINK CONTROL CHANNEL FORMAT FOR SINGLE UPLINK OPERATION IN DUAL CONNECTIVITY MODE WITH TIME DIVISION DUPLEXING PRIMARY CELL

CROSS-REFERENCE TO RELATED APPLICATION

This Patent Application claims priority to U.S. Provisional Patent Application No. 62/910,159, filed on Oct. 3, 2019, entitled "PHYSICAL UPLINK CONTROL CHANNEL FORMAT FOR SINGLE UPLINK OPERATION IN DUAL CONNECTIVITY MODE WITH TIME DIVISION DUPLEXING PRIMARY CELL," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for determining a physical uplink control channel (PUCCH) format for single uplink operation in dual connectivity mode with a time division duplexing (TDD) primary cell.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies and the telecommunication standards that employ these technologies remain useful.

SUMMARY

In some aspects, a method of wireless communication, performed by a user equipment (UE), may include: determining a physical uplink control channel (PUCCH) format and a PUCCH resource to be used for concurrently transmitting hybrid automatic repeat request (HARQ) feedback and additional uplink control information based at least in part on downlink control information including a downlink assignment index equal to one; and transmitting one or more of the HARQ feedback or the additional uplink control information using the PUCCH format and the PUCCH resource.

In some aspects, a UE for wireless communication may include a memory and one or more processors operatively coupled to the memory. The memory and the one or more processors may be configured to: determine a PUCCH format and a PUCCH resource to be used for concurrently transmitting HARQ feedback and additional uplink control information based at least in part on downlink control information including a downlink assignment index equal to one; and transmit one or more of the HARQ feedback or the additional uplink control information using the PUCCH format and the PUCCH resource.

In some aspects, a non-transitory computer-readable medium may store one or more instructions for wireless communication. The one or more instructions, when executed by one or more processors of a UE, may cause the one or more processors to: determine a PUCCH format and a PUCCH resource to be used for concurrently transmitting HARQ feedback and additional uplink control information based at least in part on downlink control information including a downlink assignment index equal to one; and transmit one or more of the HARQ feedback or the additional uplink control information using the PUCCH format and the PUCCH resource.

In some aspects, an apparatus for wireless communication may include: means for determining a PUCCH format and a PUCCH resource to be used for concurrently transmitting HARQ feedback and additional uplink control information based at least in part on downlink control information including a downlink assignment index equal to one; and means for transmitting one or more of the HARQ feedback or the additional uplink control information using the PUCCH format and the PUCCH resource.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
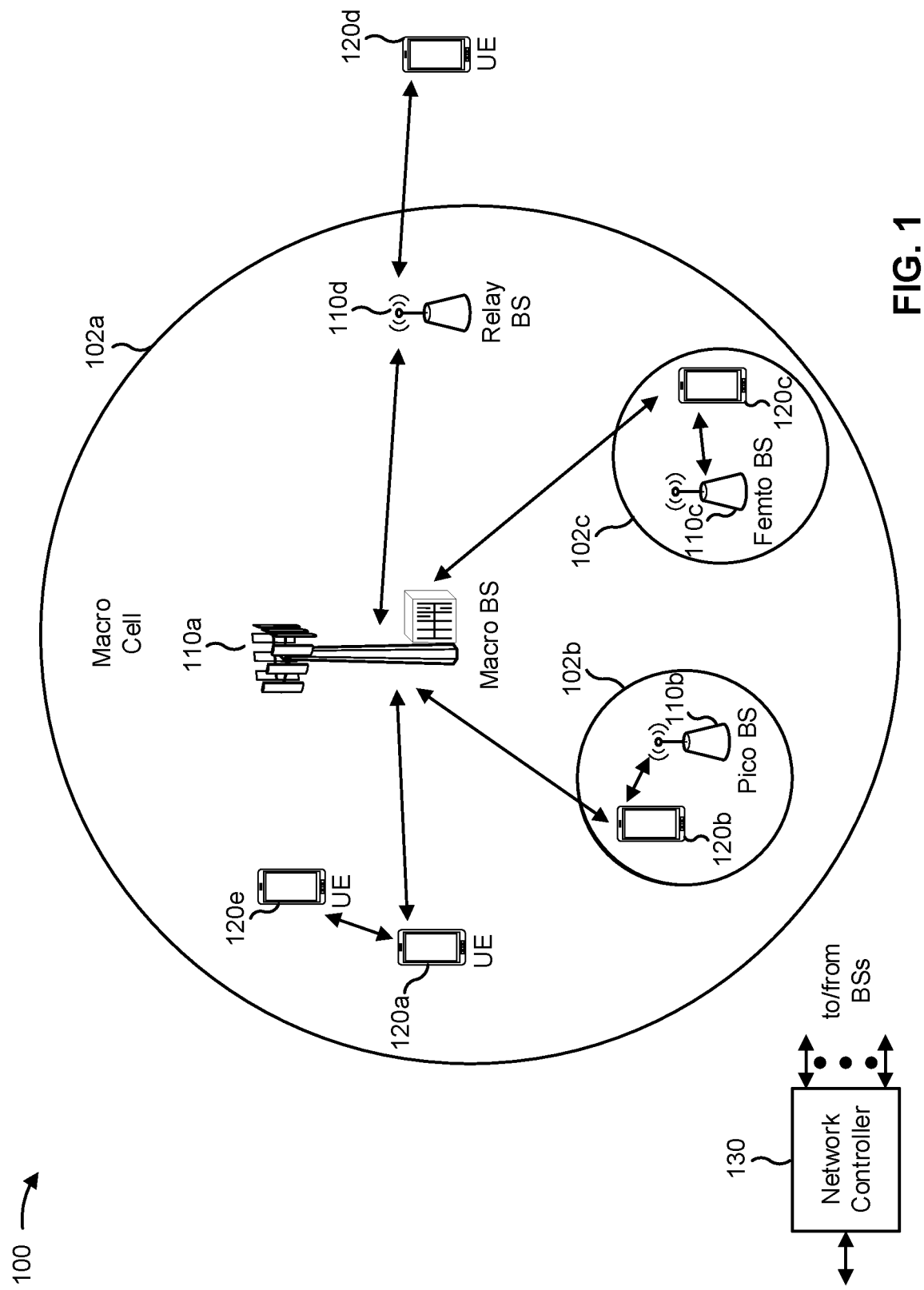
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network, an LTE network, and/or the like. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
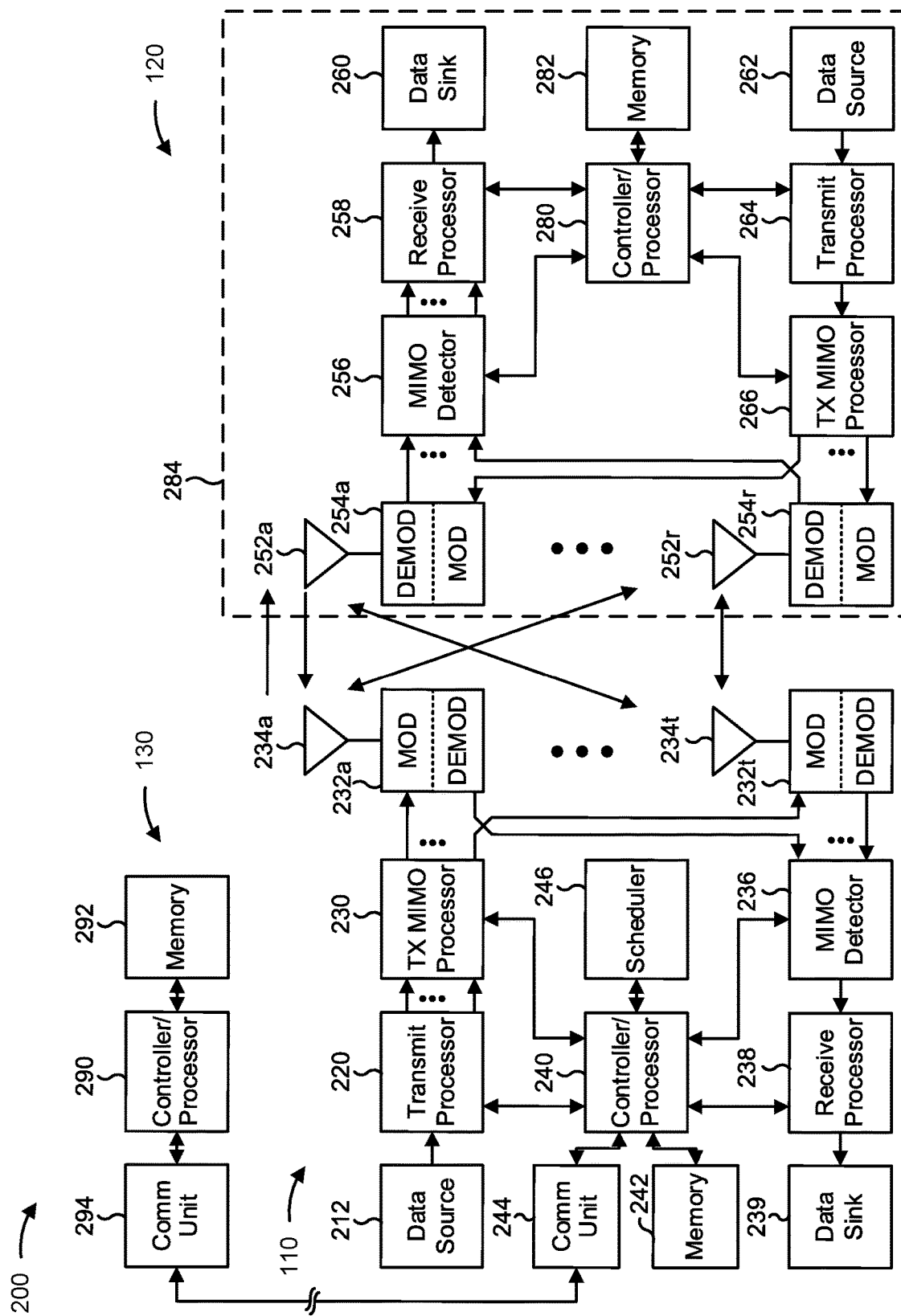
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., a cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with determining a physical uplink control channel (PUCCH) format for single uplink operation in dual connectivity mode with a time division duplexing (TDD) primary cell, as described in more detail elsewhere herein. For example, controller/processor 240 of base station 110, controller/processor 280 of UE 120, and/or any other component(s) of FIG. 2 may perform or direct operations of, for example, process 800 of FIG. 8 and/or other processes as described herein. Memories 242 and 282 may store data and program codes for base station 110 and UE 120, respectively. In some aspects, memory 242 and/or memory 282 may include a non-transitory computer-readable medium storing one or more instructions for wireless communication. For example, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direct operations of, for example, process 800 of FIG. 8 and/or other processes as described herein. In some aspects, executing instructions may include running the instructions, converting the instructions, compiling the instructions, interpreting the instructions, and/or the like.

In some aspects, UE 120 may include means for determining a PUCCH format and a PUCCH resource to be used for concurrently transmitting hybrid automatic repeat request (HARM) feedback and additional uplink control information based at least in part on downlink control information including a downlink assignment index equal to one, means for transmitting one or more of the HARQ feedback or the additional uplink control information using the PUCCH format and the PUCCH resource, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

Figure 3A:
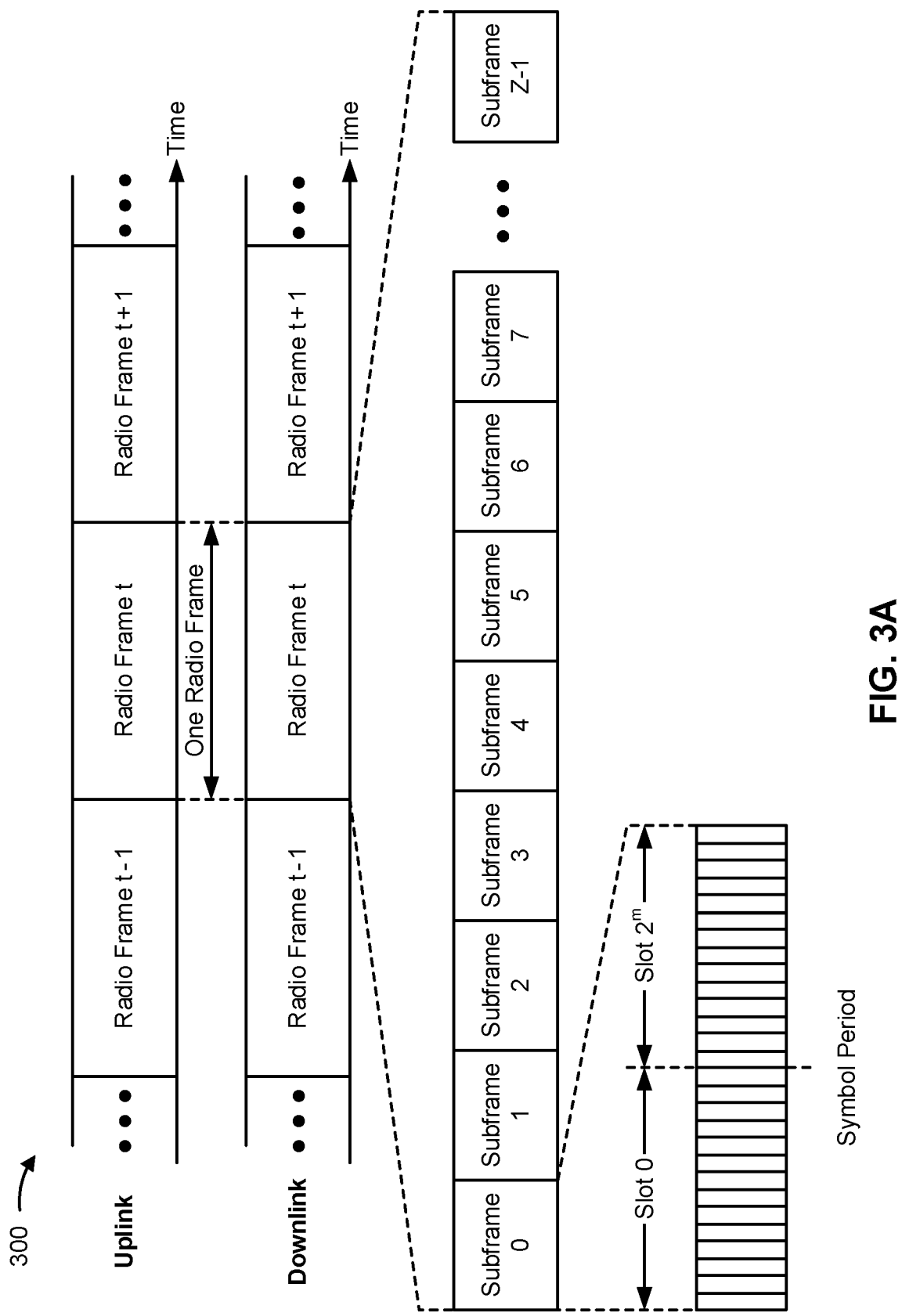
FIG. 3A is a diagram illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, "wireless communication structure" may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
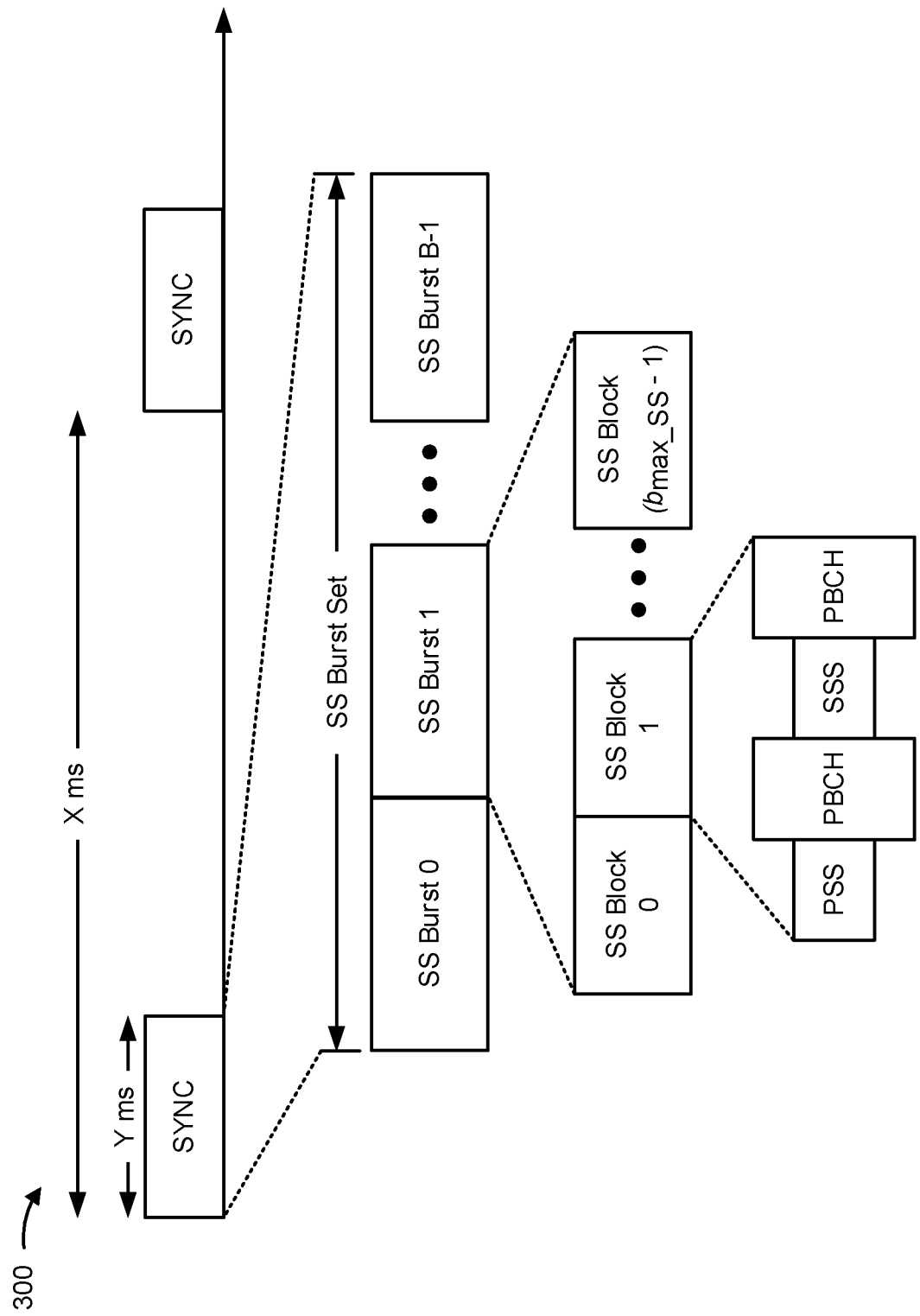
FIG. 3B is a diagram illustrating an example synchronization communication hierarchy in a wireless communication network, in accordance with various aspects of the present disclosure.

FIG. 3B is a diagram illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS}$−1), where $b_{max\_SS}$−1 is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
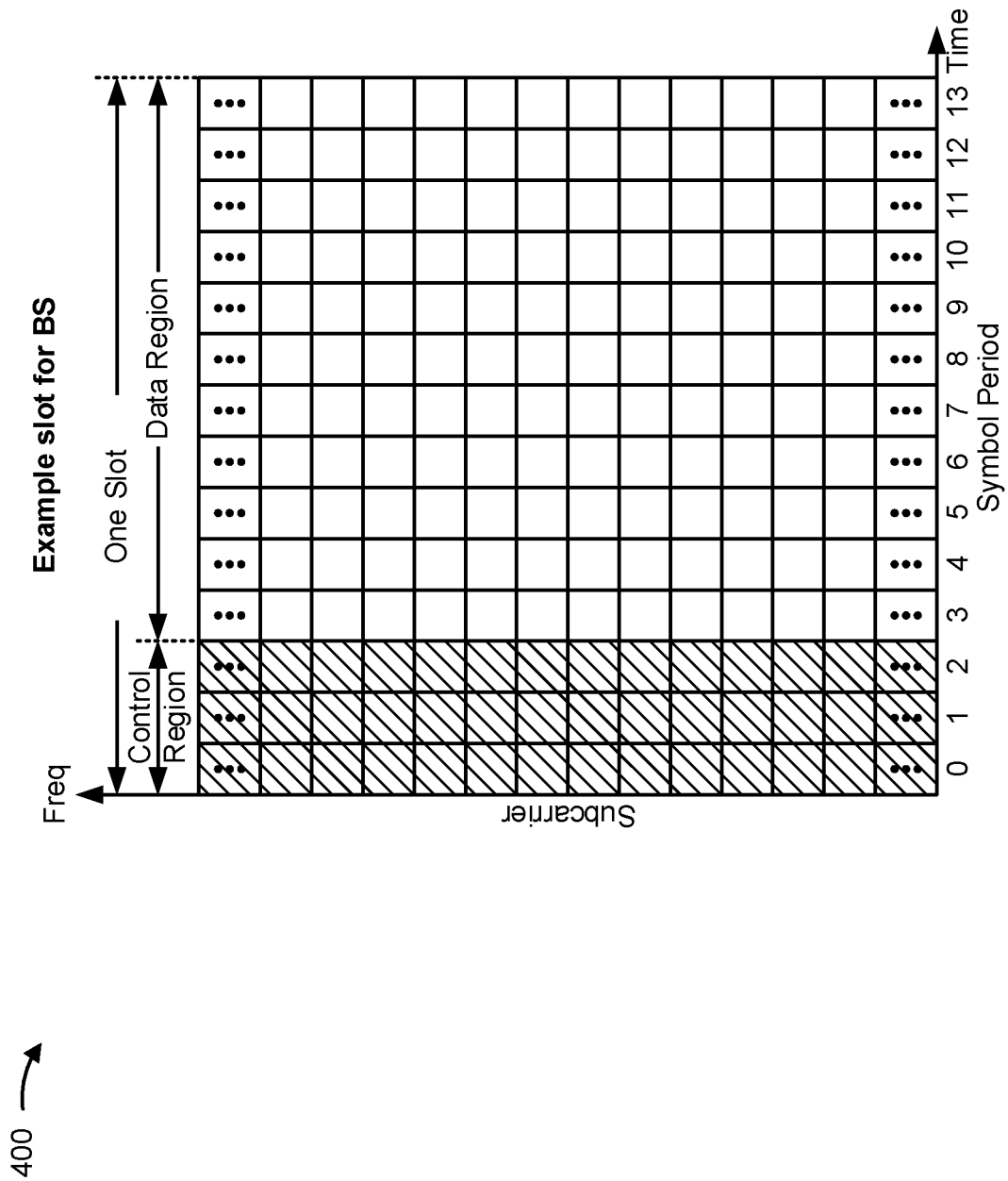
FIG. 4 is a diagram illustrating an example slot format with a normal cyclic prefix, in accordance with various aspects of the present disclosure.

FIG. 4 shows an example slot format 400 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where q∈{0, . . . Q−1}.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SNIR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In some aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In some aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra-reliable low-latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 ms duration. Each radio frame may include 40 slots and may have a length of 10 ms. Consequently, each slot may have a length of 0.25 ms. Each slot may indicate a link direction (e.g., downlink (DL) or uplink (UL)) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such as central units or distributed units.

As indicated above, FIG. 4 is provided as an example. Other examples may differ from what is described with regard to FIG. 4.

Figure 5:
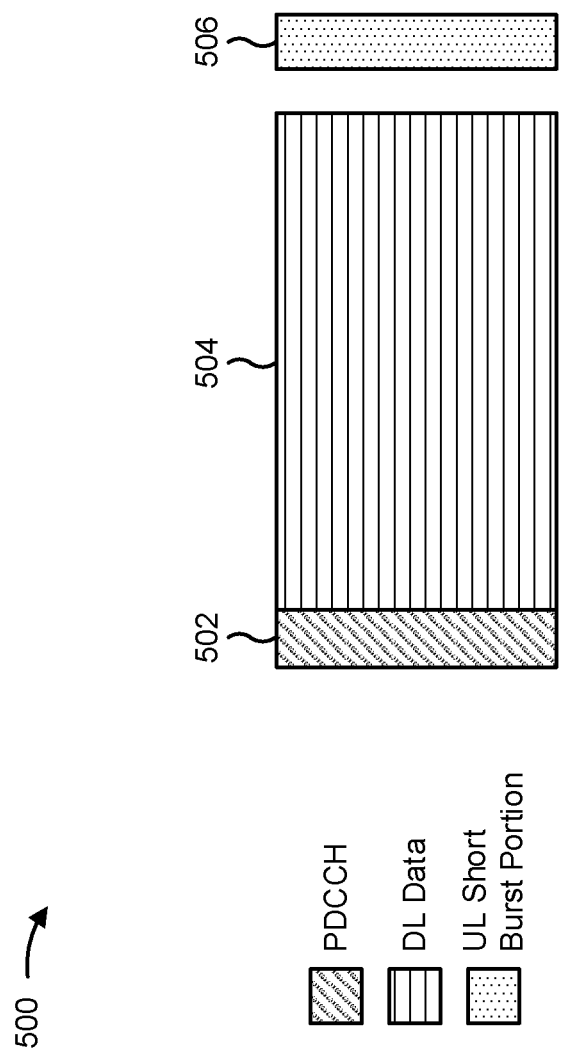
FIG. 5 is a diagram illustrating an example of a downlink-centric slot, in accordance with various aspects of the present disclosure.

FIG. 5 is a diagram 500 showing an example of a DL-centric slot or wireless communication structure. The DL-centric slot may include a control portion 502. The control portion 502 may exist in the initial or beginning portion of the DL-centric slot. The control portion 502 may include various scheduling information and/or control information corresponding to various portions of the DL-centric slot. In some configurations, the control portion 502 may be a physical DL control channel (PDCCH), as indicated in FIG. 5. In some aspects, the control portion 502 may include legacy PDCCH information, shortened PDCCH (sPDCCH) information), a control format indicator (CFI) value (e.g., carried on a physical control format indicator channel (PCFICH)), one or more grants (e.g., downlink grants, uplink grants, and/or the like), and/or the like.

The DL-centric slot may also include a DL data portion 504. The DL data portion 504 may sometimes be referred to as the payload of the DL-centric slot. The DL data portion 504 may include the communication resources utilized to communicate DL data from the scheduling entity (e.g., UE or BS) to the subordinate entity (e.g., UE). In some configurations, the DL data portion 504 may be a physical DL shared channel (PD SCH).

The DL-centric slot may also include an uplink short burst portion 506. The UL short burst portion 506 may sometimes be referred to as an uplink burst, an uplink burst portion, a common UL burst, a short burst, an uplink short burst, a common UL short burst, a common UL short burst portion, and/or various other suitable terms. In some aspects, the UL short burst portion 506 may include one or more reference signals. Additionally, or alternatively, the UL short burst portion 506 may include feedback information corresponding to various other portions of the DL-centric slot. For example, the UL short burst portion 506 may include feedback information corresponding to the control portion 502 and/or the DL data portion 504. Non-limiting examples of information that may be included in the UL short burst portion 506 include an ACK signal (e.g., a PUCCH ACK, a PUSCH ACK, an immediate ACK), a NACK signal (e.g., a PUCCH NACK, a PUSCH NACK, an immediate NACK), a scheduling request (SR), channel state information (CSI), a buffer status report (BSR), a HARQ indicator, a channel quality indicator (CQI), a sounding reference signal (SRS), a demodulation reference signal (DMRS), PUSCH data, and/or various other suitable types of information. The UL short burst portion 506 may include additional or alternative information, such as information pertaining to random access channel (RACH) procedures, scheduling requests, and various other suitable types of information.

As illustrated in FIG. 5, the end of the DL data portion 504 may be separated in time from the beginning of the UL short burst portion 506. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is one example of a DL-centric wireless communication structure, and alternative structures having similar features may exist without necessarily deviating from the aspects described herein.

As indicated above, FIG. 5 is provided as an example. Other examples may differ from what is described with regard to FIG. 5.

Figure 6:
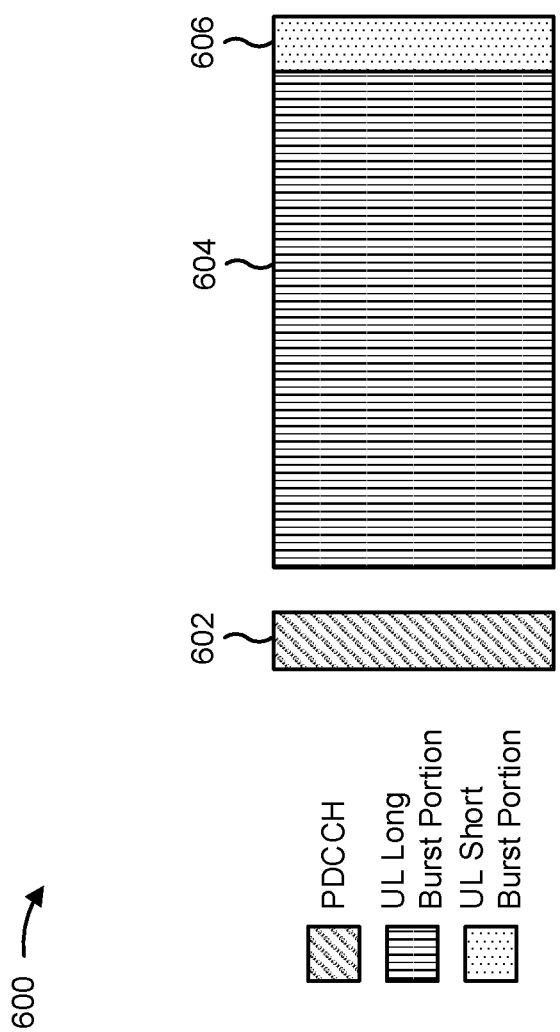
FIG. 6 is a diagram illustrating an example of an uplink-centric slot, in accordance with various aspects of the present disclosure.

FIG. 6 is a diagram 600 showing an example of an uplink-centric slot or wireless communication structure. The UL-centric slot may include a control portion 602. The control portion 602 may exist in the initial or beginning portion of the UL-centric slot. The control portion 602 in FIG. 6 may be similar to the control portion 502 described above with reference to FIG. 5. The UL-centric slot may also include an uplink long burst portion 604. The UL long burst portion 604 may sometimes be referred to as the payload of the UL-centric slot. "UL portion" may refer to the communication resources utilized to communicate UL data from the subordinate entity (e.g., UE) to the scheduling entity (e.g., UE or BS). In some configurations, the control portion 602 may be a physical DL control channel (PDCCH).

As illustrated in FIG. 6, the end of the control portion 602 may be separated in time from the beginning of the UL long burst portion 604. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric slot may also include an uplink short burst portion 606. The UL short burst portion 606 in FIG. 6 may be similar to the UL short burst portion 506 described above with reference to FIG. 5, and may include any of the information described above in connection with FIG. 5. The foregoing is one example of an uplink-centric wireless communication structure, and alternative structures having similar features may exist without necessarily deviating from the aspects described herein.

In one example, a wireless communication structure, such as a frame, may include both UL-centric slots and DL-centric slots. In this example, the ratio of UL-centric slots to DL-centric slots in a frame may be dynamically adjusted based at least in part on the amount of UL data and the amount of DL data that are transmitted. For example, if there is more UL data, then the ratio of UL-centric slots to DL-centric slots may be increased. Conversely, if there is more DL data, then the ratio of UL-centric slots to DL-centric slots may be decreased.

As indicated above, FIG. 6 is provided as an example. Other examples may differ from what is described with regard to FIG. 6.

Dual connectivity generally enables a UE to communicate using two or more radio access technologies (RATs). For example, one dual connectivity configuration is between an Evolved Universal Mobile Telecommunications System (UMTS) Terrestrial Radio Access network (E-UTRAN), such as 4G/LTE, and a NR network, such as 5G/NR, often referred to as E-UTRAN-NR dual connectivity (EN-DC). For a UE communicating in accordance with an EN-DC configuration, data may be received on both a 4G/LTE connection and a 5G/NR connection, although other configurations may be used. These connections are sometimes referred to as "legs." In some cases, a primary cell (PCell) and a secondary cell (SCell) for EN-DC may have different component carrier configurations. For example, 3GPP Release 15 includes support for a PCell having a frequency division duplexing (FDD) configuration, and this support is extended to a PCell having a time division duplexing (TDD) configuration in 3GPP Release 16. In the latter case, EN-DC may be associated with a single uplink configuration, where the TDD PCell and the SCell are subject to a time division multiplexing (TDM) configuration whereby the UE can perform uplink transmission on only one uplink carrier at a time (e.g., in a particular symbol or slot). Accordingly, in such cases, the UE may switch between communicating via the 4G/LTE connection and the 5G/NR connection in a TDM manner.

In general, because the PCell and the SCell for EN-DC can have different component carrier configurations, PUCCH formats and/or PUCCH resources that are used to transmit uplink control information may need to be properly configured (e.g., to account for timing restrictions due to the coexistence of 4G/LTE and 5G/NR, or due to another reason). For example, in some cases, the uplink control information may include hybrid automatic repeat request (HARQ) feedback in which a UE provides feedback to a transmitter (e.g., a base station) to indicate whether the UE received certain transmissions (e.g., the UE may provide HARQ feedback indicating an acknowledgement (ACK) value when the UE successfully receives a transmission, or a negative ACK (NACK) value when the UE does not receive a transmission or the transmission was unsuccessfully received). Furthermore, in some cases, the uplink control information may include a scheduling request, periodic channel state information (P-CSI), and/or the like.

In legacy LTE networks, various techniques define UE behavior to implicitly determine the PUCCH format and/or PUCCH resource to be used to transmit uplink control information. For example, in legacy LTE networks, a PUCCH resource of PUCCH formats 3, 4, or 5 is generally indicated by an ACK/NACK resource indicator (ARI) field. However, in some cases, the ARI field is not explicitly present in a downlink assignment. Instead, if the UE receives a PDCCH scheduling a PDSCH on an SCell and/or a PDCCH including downlink control information (DCI) with a downlink assignment index (DAI) field greater than one (1), then a transmit power control (TPC) field in the DCI is interpreted as the ARI field. However, if the UE does not receive DCI with a DAI field greater than one (e.g., the DAI field is equal to zero or one), then the UE may transmit HARQ feedback using PUCCH format 1a or 1b. In such cases, a PUCCH resource may be derived using an equation that utilizes the first control channel element (CCE) index over a detected PDCCH carrying the downlink assignment.

However, for single uplink operation in EN-DC with a TDD PCell, the UE is configured with a downlink-reference uplink-downlink configuration. In such cases, single uplink operation in EN-DC with a TDD PCell generally supports PUCCH formats 3, 4, and 5, but a PUCCH fallback operation based on implicit resource indication (e.g., interpreting a TPC field as an ARI field) is not supported. Accordingly, for single uplink operation in EN-DC with a TDD PCell, techniques to determine a PUCCH format and PUCCH resource to be used to transmit uplink control information suffer from various drawbacks in cases where a DAI field has a value equal to one (1) (e.g., where the UE has only one ACK/NACK bit or two ACK/NACK bits for one PDSCH).

For example, one option to determine the PUCCH format and PUCCH resource for transmitting HARQ feedback when the UE receives a PDCCH with a DAI field equal to one may be to use only PUCCH formats 3, 4, and 5. In this case, a PUCCH format 3 resource corresponding to an ARI field having value '00' is used as a default value for the PUCCH resource, and no PUCCH resources are reserved for a semi-persistent scheduling (SPS) PDSCH. Additionally, or alternatively, the PUCCH format 3 resource may be configured by a higher-layer (e.g., a radio resource control (RRC) layer), and in this case the PUCCH resource can be different from the default resource associated with ARI field '00'. Furthermore, another option to determine the PUCCH format and PUCCH resource for transmitting HARQ feedback when the UE receives a PDCCH with a DAI field equal to one may be to use an explicit PUCCH format 1a or 1b resource for the HARQ feedback transmission. In this case, PUCCH resources may be reserved for SPS PDSCH for the UE in a similar manner as legacy LTE networks, and PUCCH format 1b with channel selection is used when the UE receives a PDCCH with a DAI field equal to one. Otherwise, if the DAI field is greater than one, PUCCH format 3, 4, or 5 may be used. However, these options generally do not take into account cases where there may be additional uplink control information to be concurrently transmitted with the HARQ feedback. For example, in legacy LTE networks, scheduling requests are generally transmitted using PUCCH format 1, and CSI feedback is generally transmitted using PUCCH format 2. Accordingly, existing options for determining the PUCCH format and PUCCH resource in EN-DC generally do not specify how to multiplex HARQ feedback with additional uplink control information in cases where a UE receives DCI in which the DAI field equals one.

Some aspects described herein provide techniques and apparatuses to determine a PUCCH format and a PUCCH resource that a UE is to use to concurrently transmit HARQ feedback and additional uplink control information (e.g., a scheduling request, P-CSI, and/or the like) when the UE receives DCI that includes a DAI field having a value equal to one. For example, as described in further detail herein, a UE may receive, from a base station, DCI that includes a DAI field to indicate a number of PDSCH communications that the UE has received, up to the current DCI. For example, the UE may receive an indication of a counter DAI and/or a total DAI. The value of the counter DAI may denote an accumulative quantity of serving cell PDCCH monitoring occasions in which PDSCH reception or SPS PDSCH release is present, up to the current serving cell and current PDCCH monitoring occasion. The value of total DAI, when present, may denote the total number of serving cell PDCCH monitoring occasion pairs in which PDSCH reception and SPS PDSCH release is present, up to the current PDCCH monitoring occasion.

In some aspects, the UE may determine uplink control information to be transmitted in a next feedback occasion, where the uplink control information may include HARQ feedback, a scheduling request, P-CSI, and/or the like. Accordingly, as described herein, the UE may employ one or more techniques to determine the PUCCH format and the PUCCH resource to be used to transmit the uplink control information in the next feedback occasion based at least in part on a value of the DAI field contained in the DCI and the uplink control information to be transmitted in a next feedback occasion. For example, different techniques may be used to select the PUCCH format and/or the PUCCH resource in cases where there is no HARQ feedback to be transmitted, in cases where there is HARQ feedback to be transmitted and the value of the DAI field is greater than one, and in cases where there is HARQ feedback and additional uplink control information to be transmitted when the value of the DAI field is equal to one. Furthermore, different techniques may be employed to determine the PUCCH format and/or the PUCCH resource to be used to transmit the uplink control information depending on whether the additional uplink control information includes a scheduling request, a positive scheduling request, a negative scheduling request, P-CSI, and/or the like. In this way, a UE may determine the appropriate PUCCH format and/or resource to be used when transmitting uplink control information based at least in part on the value of the DAI field, the uplink control information to be transmitted, and/or the like, which enables support for single uplink operation in EN-DC with a TDD PCell.

Figure 7:
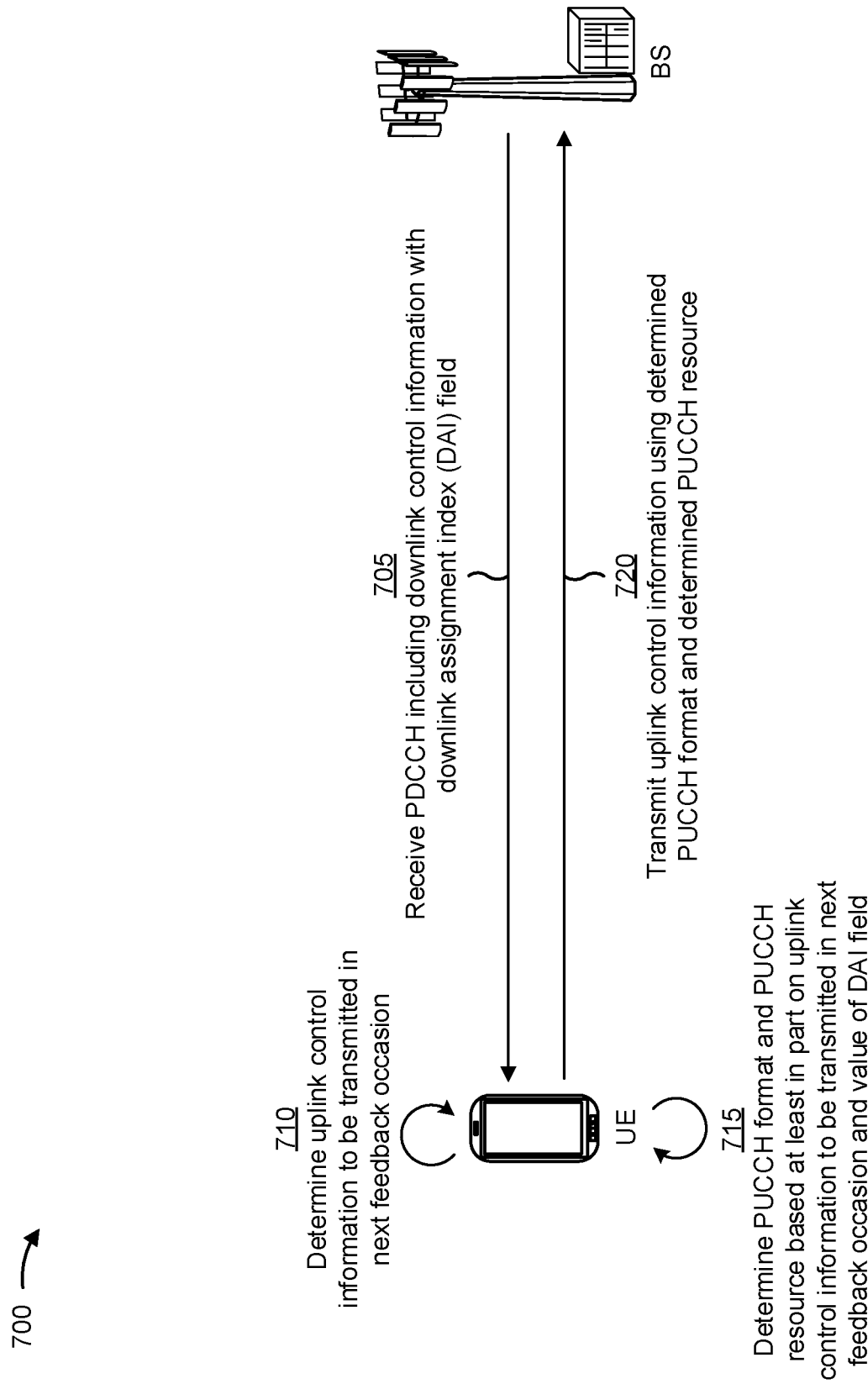
FIG. 7 is a diagram illustrating an example implementation of determining a physical uplink control channel format for single uplink operation in dual connectivity mode with a time division duplexing primary cell, in accordance with various aspects of the present disclosure.

FIG. 7 is a diagram illustrating an example implementation 700 of determining a PUCCH format for single uplink operation in dual connectivity mode with a TDD PCell, in accordance with various aspects of the present disclosure. As shown in FIG. 7, example implementation 700 includes a UE communicating with a base station. Furthermore, as described herein, the UE may be communicating with the base station according to an EN-DC configuration in which a single uplink is used (e.g., switching between LTE and NR in a TDM manner, whereby the UE can only transmit on one uplink carrier at a particular time).

As shown in FIG. 7, and by reference number 705, the base station may transmit, and the UE may receive, a PDCCH that includes DCI with a DAI field, which the base station may use to track downlink communications scheduled for the UE 120. For example, in some aspects, the DAI field may be a counter that the base station increments for each downlink transmission that is scheduled for the UE. In some aspects, the value of the DAI field may be incremented in a frequency-first, time-second manner. In some aspects, the base station may indicate the last two bits (e.g., the two least significant bits) of the DAI field to the UE in the DCI (e.g., in a downlink grant). Additionally, or alternatively, the base station may indicate a total number of downlink communications scheduled for the UE in an uplink grant for HARQ feedback corresponding to the downlink communications (e.g., a total quantity of downlink communications scheduled in a bundle window that needs to be acknowledged or negatively acknowledged by the UE in HARQ feedback corresponding to the uplink grant). In this way, the UE can use the value of the DAI field to resolve missed downlink grants and/or downlink communications that are not successfully received. For example, the value of the DAI field may generally indicate how many downlink assignments the UE should have received so far within a current bundling window, which may enable the UE to detect missed downlink grants, unsuccessful downlink communications, and/or the like in cases where the UE detects that the value of the DAI field differs from a quantity of correctly received downlink assignments.

As further shown in FIG. 7, and by reference number 710, the UE may determine uplink control information to be transmitted in a next feedback occasion. For example, in some aspects, the uplink control information to be transmitted in the next feedback occasion may include HARQ feedback (e.g., including one or more ACK and/or NACK messages for one or more downlink communications). Additionally, or alternatively, the uplink control information may include a scheduling request (e.g., a physical layer message requesting uplink resources to transmit a physical uplink shared channel (PUSCH)), periodic channel state information (P-CSI), and/or the like.

As further shown in FIG. 7, and by reference number 715, the UE may determine a PUCCH format and a PUCCH resource to be used in the next feedback occasion based at least in part on the uplink control information to be transmitted in the next feedback occasion and a value of the DAI field in the DCI received from the base station. In some aspects, as mentioned above, the UE may use different techniques to determine the PUCCH format and the PUCCH resource depending on whether the uplink control information to be transmitted in the next feedback occasion does not include HARQ feedback, includes HARQ feedback and the value of the DAI field is greater than one, includes HARQ feedback and the value of the DAI field is equal to one, and/or the like. Furthermore, in some aspects, the PUCCH format and the PUCCH resource to be used in the next feedback occasion may depend on whether the uplink control information includes additional uplink control information (e.g., a scheduling request, P-CSI, and/or the like) that overlaps with HARQ feedback (e.g., is to be concurrently transmitted with the HARQ feedback), as described herein.

For example, in some aspects, the UE may be associated with a first configuration in which uplink control information is to be transmitted using PUCCH format 3, 4, or 5 and a PUCCH resource associated with an ARI field having a value of '00' (e.g., a resource associated with PUCCH format 3 that corresponds to the ARI field having a value of '00'). Additionally, or alternatively, the UE may be associated with a second configuration in which the UE uses an explicit PUCCH format 1a or 1b resource to fallback to an RRC-configured PUCCH format 1a or 1b resource. Additionally, or alternatively, the UE may be associated with a third configuration in which uplink control information is to be transmitted using PUCCH format 3, 4, or 5 and the PUCCH resource is configured by a higher layer (e.g., an RRC layer), which may be the same or different from the PUCCH resource associated with the ARI field having the value of '00'. Furthermore, in each of the first, second, and third configurations, a scheduling request may be configured in accordance with PUCCH format 1, a P-CSI may be configured in accordance with PUCCH format 2, and/or the like.

In some aspects, when the uplink control information to be transmitted in the next feedback occasion includes a scheduling request and the UE is associated with the first configuration and/or the third configuration, the UE may determine the PUCCH format and the PUCCH resource based at least in part on whether there is also HARQ feedback to be transmitted in the next feedback occasion and/or a value of the DAI field. For example, in some aspects, the UE may transmit the scheduling request using PUCCH format 1 (e.g., the default configuration for a scheduling request) if there is no HARQ feedback to be transmitted concurrently with the scheduling request. In some aspects, in cases where the UE has HARQ feedback to be transmitted concurrently with the scheduling request and the value of the DAI field is greater than one, the UE may transmit the HARQ feedback and the scheduling request using PUCCH format 3, 4, or 5, and one or more bits for the scheduling request may be appended after one or more bits for the HARQ feedback in the PUCCH format 3, 4, or 5.

In some aspects, in cases where the UE has HARQ feedback to be transmitted concurrently with the scheduling request and the value of the DAI field is equal to one, the UE may determine the PUCCH format and/or PUCCH resource to be used based at least in part on whether the scheduling request is a positive scheduling request (e.g., an indication to request uplink resources) or a negative scheduling request (e.g., an indication that no uplink resources are requested). For example, in cases where the scheduling request is a positive scheduling request, the UE may transmit the HARQ feedback using PUCCH format 1a or 1b on a resource that is reserved for the scheduling request, and in cases where the scheduling request is a negative scheduling request, the UE may multiplex one or more bits for the scheduling request with one or more bits for the HARQ feedback in PUCCH format 3 (e.g., because the resource reserved for the scheduling request does not need to be used). Alternatively, in some aspects, one or more bits for the scheduling request may be appended after one or more bits for the HARQ feedback in the PUCCH format 3, 4, or 5, regardless of whether the scheduling request is positive or negative, when the UE has HARQ feedback to be transmitted concurrently with the scheduling request and the value of the DAI field is equal to one.

In some aspects, when the uplink control information to be transmitted includes a scheduling request and the UE is associated with the second configuration, the UE may transmit the scheduling request using PUCCH format 1 (e.g., the default configuration for a scheduling request) if there is no HARQ feedback to be transmitted concurrently with the scheduling request. Alternatively, in cases where the UE has HARQ feedback to be transmitted concurrently with the scheduling request and the value of the DAI field is greater than one, the UE may transmit the HARQ feedback and the scheduling request using PUCCH format 3, 4, or 5, and one or more bits for the scheduling request may be appended after one or more bits for the HARQ feedback in the PUCCH format 3, 4, or 5, in a similar manner as described above with respect to the first configuration and the third configuration.

In some aspects, in cases where the UE is associated with the second configuration and there is HARQ feedback to be transmitted concurrently with the scheduling request when the value of the DAI field is equal to one, the UE may determine the PUCCH format and/or PUCCH resource to be used based at least in part on an RRC configuration associated with a PUCCH 1a or 1b resource. For example, in cases where the scheduling request is a positive scheduling request, the UE may transmit the HARQ feedback using PUCCH format 1a or 1b on a resource that is reserved for the scheduling request, and in cases where the scheduling request is a negative scheduling request, the UE may transmit the HARQ feedback using PUCCH format 1a or 1b on an RRC-configured resource for PUCCH format 1a or 1b. Alternatively, in some aspects, the HARQ feedback and the scheduling request may be transmitted using a channel selection procedure associated with PUCCH format 1b, and using a scheduling request resource and an RRC-configured resource for PUCCH format 1a or 1b, regardless of whether the scheduling request is positive or negative.

In some aspects, when the uplink control information to be transmitted in the next feedback occasion includes P-CSI, the UE may determine the PUCCH format and the PUCCH resource based at least in part on whether there is also HARQ feedback to be transmitted in the next feedback occasion and/or a value of the DAI field. For example, in some aspects, the UE may transmit the P-CSI using PUCCH format 2 (e.g., the default configuration for P-CSI) if there is no HARQ feedback to be transmitted concurrently with the P-CSI. In some aspects, in cases where the UE has HARQ feedback to be transmitted concurrently with the P-CSI and the value of the DAI field is greater than one, the P-CSI may be multiplexed with one or more bits for the HARQ feedback using PUCCH format 3, 4, or 5.

In some aspects, in cases where the UE has HARQ feedback to be transmitted concurrently with the P-CSI and the value of the DAI field is equal to one, the UE may determine the PUCCH format and/or PUCCH resource to be used based at least in part on whether the UE is associated with the first configuration (e.g., using PUCCH format 3, 4, or 5 and a PUCCH resource associated with an ARI field having a value of '00'), the second configuration (e.g., using an explicit PUCCH format 1a or 1b resource to fallback to an RRC-configured PUCCH format 1a or 1b resource), or the third configuration (e.g., using PUCCH format 3, 4, or 5 and a PUCCH resource configured by a higher layer, which may be the same or different from the PUCCH resource associated with the ARI field having the value of '00').

For example, in cases where the UE is associated with the first configuration and/or the third configuration, the UE may determine that the P-CSI is to be dropped and the HARQ feedback is to be transmitted using PUCCH format 3. Alternatively, in some aspects, the UE may determine that the P-CSI and the HARQ feedback are to be multiplexed and transmitted using PUCCH format 2a, 2b, or 3. In cases where the UE is associated with the second configuration, the UE may determine that the P-CSI and the HARQ feedback are to be multiplexed and transmitted using PUCCH format 2a or 2b, or the UE may determine that the P-CSI is to be dropped and the HARQ feedback is to be transmitted using an RRC-configured resource associated with PUCCH format 1a or 1b.

As further shown in FIG. 7, and by reference number 720, the UE may transmit the uplink control information to the base station using the determined PUCCH format and the determined PUCCH resource. For example, when the uplink control information does not include HARQ feedback, the UE may transmit a scheduling request using PUCCH format 1, transmit P-CSI using PUCCH format 2, and/or the like. In other examples, when the uplink control information includes HARQ feedback and additional uplink control information (e.g., a scheduling request, P-CSI, and/or the like), one or more bits for the additional uplink control information may be appended to and/or multiplexed with one or more bits for the HARQ feedback using PUCCH format 3, 4, or 5 in cases where the DAI field has a value greater than one. Otherwise, when the uplink control information includes HARQ feedback and additional uplink control information and the DAI field has a value equal to one, various techniques can be used to transmit the uplink control information depending on whether the additional uplink control information includes a scheduling request and/or P-CSI.

For example, as described above, HARQ feedback may be transmitted using PUCCH format 1a or 1b on a resource reserved for a scheduling request in cases where the additional uplink control information includes a positive scheduling request, or one or more bits for the scheduling request may be multiplexed with one or more bits for the HARQ feedback using PUCCH format 3 in cases where the additional uplink control information includes a negative scheduling request. Additionally, or alternatively, in some aspects, one or more bits for the additional uplink control information may be appended to one or more bits for the HARQ feedback in PUCCH format 3, 4, or 5, regardless of whether the scheduling request is positive or negative (e.g., in a similar manner as in cases where the DAI field has a value greater than one). Alternatively, in some aspects, the HARQ feedback and the scheduling request may be concurrently transmitted based at least in part on a fallback to an RRC-configured PUCCH format 1a or 1b. For example, the HARQ feedback may be transmitted using PUCCH format 1a or 1b on an RRC-configured PUCCH format 1a or 1b resource in cases where the scheduling request is negative, or the HARQ feedback and the scheduling request may be transmitted using a channel selection procedure associated with PUCCH format 1b using a scheduling request resource and an RRC-configured PUCCH format 1a or 1b resource regardless of whether the scheduling request is positive or negative.

In some aspects, in cases where the additional uplink control information includes P-CSI, transmitting the HARQ feedback and the additional uplink control information may include dropping the P-CSI and transmitting the HARQ feedback using PUCCH format 3 and/or an RRC-configured resource associated with PUCCH format 1a or 1b. Alternatively, in some aspects, transmitting the HARQ feedback and the additional uplink control information may include multiplexing the P-CSI and the HARQ feedback and transmitting the multiplexed P-CSI and HARQ feedback using PUCCH format 2a, 2b, and/or 3.

As indicated above, FIG. 7 is provided as an example. Other examples may differ from what is described with respect to FIG. 7.

Figure 8:
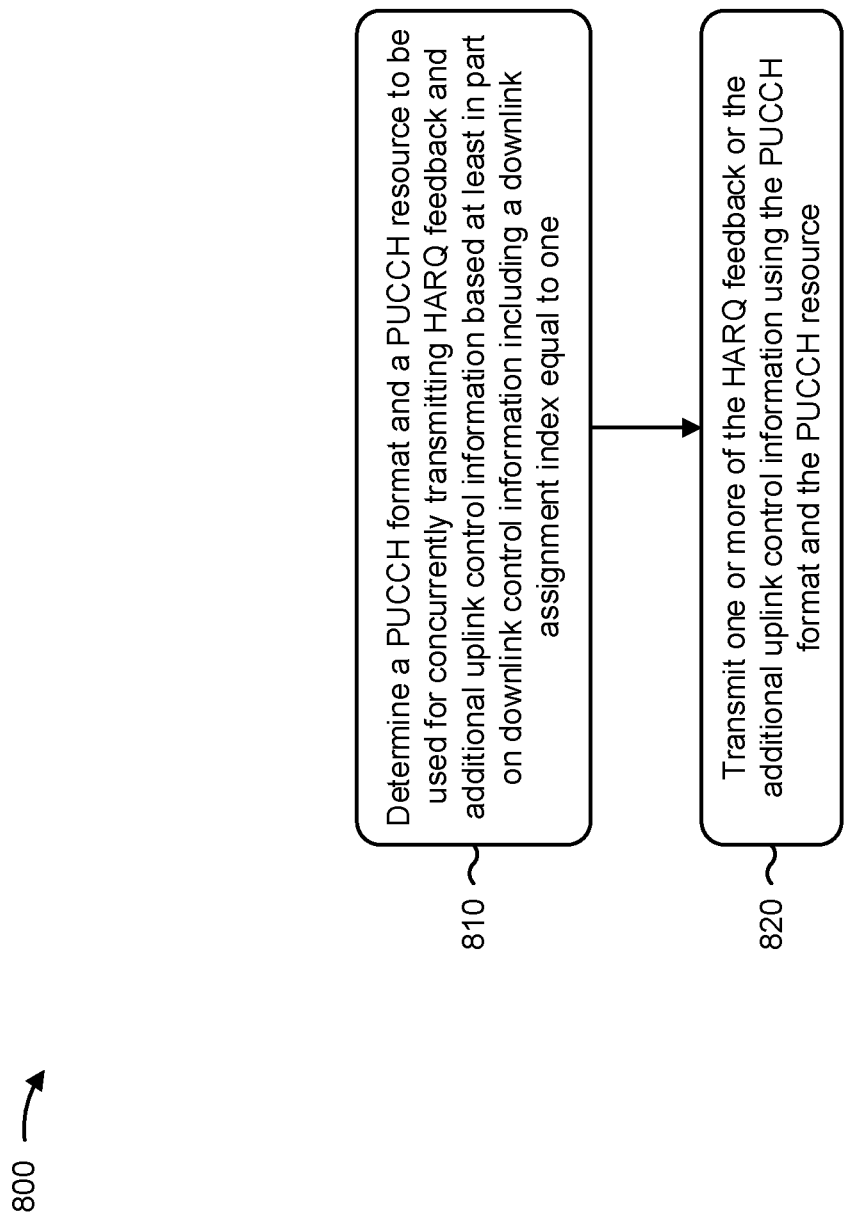
FIG. 8 is a diagram illustrating an example process performed, for example, by a UE, in accordance with various aspects of the present disclosure.

FIG. 8 is a diagram illustrating an example process 800 performed, for example, by a UE, in accordance with various aspects of the present disclosure. Example process 800 is an example where a UE (e.g., UE 120 and/or the like) performs operations associated with determining a PUCCH format for single uplink operation in dual connectivity mode with a TDD primary cell.

As shown in FIG. 8, in some aspects, process 800 may include determining a PUCCH format and a PUCCH resource to be used for concurrently transmitting HARQ feedback and additional uplink control information based at least in part on downlink control information including a DAI equal to one (block 810). For example, the UE may determine (e.g., using controller/processor 280 and/or the like) a PUCCH format and a PUCCH resource to be used for concurrently transmitting HARQ feedback and additional uplink control information based at least in part on downlink control information including a DAI equal to one, as described above.

As further shown in FIG. 8, in some aspects, process 800 may include transmitting one or more of the HARQ feedback or the additional uplink control information using the PUCCH format and the PUCCH resource (block 820). For example, the UE may transmit (e.g., using controller/processor 280, transmit processor 264, TX MIMO processor 266, MOD 254, antenna 252, and/or the like) one or more of the HARQ feedback or the additional uplink control information using the PUCCH format and the PUCCH resource, as described above.

Process 800 may include additional aspects, such as any single aspect or any combination of aspects described below and/or in connection with one or more other processes described elsewhere herein.

In a first aspect, the additional uplink control information includes one or more of a scheduling request or P-CSI.

In a second aspect, alone or in combination with the first aspect, the PUCCH format is PUCCH format 1a or 1b, and the PUCCH resource includes one or more bits that are reserved for a scheduling request based at least in part on the additional uplink control information including a positive scheduling request.

In a third aspect, alone or in combination with one or more of the first and second aspects, the PUCCH format is PUCCH format 3, and the PUCCH resource includes one or more bits that are reserved for the HARQ feedback based at least in part on the additional uplink control information including a negative scheduling request.

In a fourth aspect, alone or in combination with one or more of the first through third aspects, the PUCCH format is PUCCH format 3, 4, or 5, and the PUCCH resource includes a scheduling request bit appended to one or more bits in the PUCCH format that are reserved for the HARQ feedback based at least in part on the additional uplink control information including a scheduling request.

In a fifth aspect, alone or in combination with one or more of the first through fourth aspects, the PUCCH format is PUCCH format 1a or 1b based at least in part on the additional uplink control information including a negative scheduling request, and transmitting the one or more of the HARQ feedback or the additional uplink control information includes transmitting the HARQ feedback and the negative scheduling request based at least in part on an RRC configuration associated with the PUCCH format 1a or 1b.

In a sixth aspect, alone or in combination with one or more of the first through fifth aspects, the one or more of the HARQ feedback or the additional uplink control information is transmitted in a channel selection procedure associated with PUCCH format 1b using a scheduling request resource.

In a seventh aspect, alone or in combination with one or more of the first through sixth aspects, the PUCCH format is PUCCH format 3 based at least in part on the additional uplink control information including P-CSI, and transmitting the one or more of the HARQ feedback or the additional uplink control information includes dropping the P-CSI and transmitting the HARQ feedback using the PUCCH format 3.

In an eighth aspect, alone or in combination with one or more of the first through seventh aspects, the PUCCH format is PUCCH format 2a, 2b, or 3 based at least in part on the additional uplink control information including P-CSI, and transmitting the one or more of the HARQ feedback or the additional uplink control information includes multiplexing the HARQ feedback with the P-CSI and transmitting the HARQ feedback multiplexed with the P-CSI using the PUCCH format 2a, 2b, or 3.

In a ninth aspect, alone or in combination with one or more of the first through eighth aspects, the PUCCH format is PUCCH format 1a or 1b based at least in part on the additional uplink control information including P-CSI, and transmitting the one or more of the HARQ feedback or the additional uplink control information includes dropping the P-CSI and transmitting the HARQ feedback based at least in part on an RRC configuration associated with the PUCCH format 1a or 1b.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed at a user equipment (UE), comprising:
    receiving downlink control information (DCI) including a downlink assignment index equal to one,
        wherein a physical uplink control channel (PUCCH) format and a PUCCH resource associated with the PUCCH format are based at least in part on uplink control information, including a scheduling request, to be transmitted and the downlink assignment index, and
        wherein the PUCCH format includes a first bit, associated with hybrid automatic repeat request (HARQ) feedback, and a second bit, appended after the first bit, associated with the scheduling request; and
    transmitting both the HARQ feedback and the scheduling request using the PUCCH format.

2. The method of claim 1, wherein:
    the PUCCH format is a PUCCH format 1a or a PUCCH format 1b, and
    the scheduling request is a positive scheduling request.

3. The method of claim 1, wherein:
    the PUCCH format is a PUCCH format 3, and
    the scheduling request is a negative scheduling request.

4. The method of claim 1, wherein the PUCCH format is a PUCCH format 3, a PUCCH format 4, or a PUCCH format 5.

5. The method of claim 1, wherein:
    the PUCCH format is a PUCCH format 1a or a PUCCH format 1b,
    the scheduling request is a negative scheduling request, and wherein the HARQ feedback and the negative scheduling request are both transmitted based at least in part on a radio resource control configuration associated with the PUCCH format 1a or the PUCCH format 1b.

6. The method of claim 1, wherein:
the PUCCH format is a PUCCH format 3, and
the uplink control information further includes periodic channel state information (P-CSI).

7. The method of claim 1, wherein:
the PUCCH format is a PUCCH format 2a, a PUCCH format 2b, or a PUCCH format 3, the uplink control information further includes periodic channel state information (P-CSI), and
the HARQ feedback is multiplexed with the P-CSI.

8. The method of claim 1, wherein:
the PUCCH format is a PUCCH format 1a or a PUCCH format 1b, and
the uplink control information further includes periodic channel state information (P-CSI).

9. An apparatus for wireless communication, comprising:
one or more memories comprising instructions; and
one or more processors configured to execute the instructions and cause the apparatus to:
    receive downlink control information (DCI) including a downlink assignment index equal to one,
        wherein a physical uplink control channel (PUCCH) format and a PUCCH resource associated with the PUCCH format are based at least in part on uplink control information, including a scheduling request, to be transmitted and the downlink assignment index, and
        wherein the PUCCH format includes a first bit, associated with hybrid automatic repeat request (HARQ) feedback, and a second bit, appended after the first bit, associated with the scheduling request; and
    output for transmission both the HARQ feedback and the scheduling request using the PUCCH format.

10. The apparatus of claim 9, wherein:
the PUCCH format is a PUCCH format 1a or a PUCCH format 1b, and
the scheduling request is a positive scheduling request.

11. The apparatus of claim 9, wherein:
the PUCCH format is a PUCCH format 3, and
the scheduling request is a negative scheduling request.

12. The apparatus of claim 9, wherein the PUCCH format is a PUCCH format 3, a PUCCH format 4, or a PUCCH format 5.

13. The apparatus of claim 9, wherein:
the PUCCH format is a PUCCH format 1a or a PUCCH format 1b,
the scheduling request is a negative scheduling request, and
the HARQ feedback and the negative scheduling request are both outputted for transmission based at least in part on a radio resource control configuration associated with the PUCCH format 1a or the PUCCH format 1b.

14. The apparatus of claim 9, wherein:
the PUCCH format is a PUCCH format 3, and
the uplink control information further includes periodic channel state information (P-CSI).

15. The apparatus of claim 9, wherein:
the PUCCH format is a PUCCH format 2a, a PUCCH format 2b, or a PUCCH format 3,
the uplink control information further includes periodic channel state information (P-CSI), and
the HARQ feedback is multiplexed with the P-CSI.

16. The apparatus of claim 9, wherein:
the PUCCH format is a PUCCH format 1a or a PUCCH format 1b, and
the uplink control information further includes periodic channel state information (P-CSI).

17. An apparatus for wireless communication, comprising:
means for receiving downlink control information (DCI) including a downlink assignment index equal to one,
    wherein a physical uplink control channel (PUCCH) format and a PUCCH resource associated with the PUCCH format are based at least in part on uplink control information, including a scheduling request, to be transmitted and the downlink assignment index, and
    wherein the PUCCH format includes a first bit, associated with hybrid automatic repeat request (HARQ) feedback, and a second bit, appended after the first bit, associated with the scheduling request; and
means for outputting for transmission both the HARQ feedback and the scheduling request using the PUCCH format.

18. The apparatus of claim 17, wherein:
the PUCCH format is a PUCCH format 1a or a PUCCH format 1b, and wherein the scheduling request is a positive scheduling request, or
the PUCCH format is a PUCCH format 3, and wherein the scheduling request is a negative scheduling request.

19. The apparatus of claim 17, wherein the PUCCH format is a PUCCH format 3, a PUCCH format 4, or a PUCCH format 5.

20. The apparatus of claim 17, wherein:
the PUCCH format is a PUCCH format 1a or a PUCCH format 1b,
the scheduling request is a negative scheduling request, and
the HARQ feedback and the negative scheduling request are both transmitted based on a radio resource control configuration associated with the PUCCH format 1a or the PUCCH format 1b.

21. The apparatus of claim 17, wherein:
the PUCCH format is PUCCH format 3, and
the uplink control information includes periodic channel state information (P-CSI).

22. The apparatus of claim 17, wherein:
the PUCCH format is a PUCCH format 2a, a PUCCH format 2b, or a PUCCH format 3,
the uplink control information includes periodic channel state information (P-CSI), and
HARQ feedback is multiplexed with the P-CSI.

23. The apparatus of claim 9, further comprising at least one transceiver to transmit both the HARQ feedback and the scheduling request using the PUCCH format.

24. A user equipment, comprising:
one or more transceivers;
one or more memories comprising instructions; and
one or more processors configured to execute the instructions and cause the UE to:
    receive, via the one or more transceivers, downlink control information (DCI) including a downlink assignment index equal to one,
        wherein a physical uplink control channel (PUCCH) format and a PUCCH resource associated with the PUCCH format are based at least in part on uplink control information, including a scheduling request, to be transmitted and the downlink assignment index, and wherein the PUCCH format includes a first bit, associated with hybrid automatic repeat request (HARQ) feedback, and a second bit, appended after the first bit, associated with the scheduling request; and transmit, via the one or more transceivers, both the HARQ feedback and the scheduling request using the PUCCH format.

25. The UE of claim 24, wherein:
the PUCCH format is a PUCCH format 1a or a PUCCH format 1b, and
the scheduling request is a positive scheduling request.

26. The UE of claim 24, wherein:
the PUCCH format is a PUCCH format 3, and
the scheduling request is a negative scheduling request.

27. The UE of claim 24, wherein the PUCCH format is a PUCCH format 3, a PUCCH format 4, or a PUCCH format 5.

28. The UE of claim 24, wherein:
the PUCCH format is a PUCCH format 1a or a PUCCH format 1b,
the scheduling request is a negative scheduling request, and
the HARQ feedback and the negative scheduling request are both transmitted based at least in part on a radio resource control configuration associated with the PUCCH format 1a or the PUCCH format 1b.

29. The UE of claim 24, wherein:
the PUCCH format is a PUCCH format 3, and
the uplink control information further includes periodic channel state information (P-CSI).

30. The UE of claim 24, wherein:
the PUCCH format is a PUCCH format 2a, a PUCCH format 2b, or a PUCCH format 3,
the uplink control information further includes periodic channel state information (P-CSI), and
the HARQ feedback is multiplexed with the P-CSI.

* * * * *